Dec. 6, 1966 J. TASSO 3,290,431

TRANSMISSION SYSTEM FOR COLOR TELEVISION AND TRANSMITTERS AND RECEIVERS FOR USE IN SUCH SYSTEMS

Filed May 10, 1963 2 Sheets-Sheet 1

INVENTOR.
JOSEPH TASSO
BY
Frank R. Jifari
AGENT

INVENTOR.
JOSEPH TASSO
BY
[signature]
AGENT

United States Patent Office 3,290,431

Patented Dec. 6, 1966

3,290,431

TRANSMISSION SYSTEM FOR COLOR TELEVISION AND TRANSMITTERS AND RECEIVERS FOR USE IN SUCH SYSTEMS

Joseph Tasso, Fresnes (Seine), France, assignor to North American Philips Company, Inc., New York, N.Y., a corporation of Delaware Filed May 10, 1963, Ser. No. 279,423
Claims priority, application France, Nov. 9, 1962, 914,973
5 Claims. (Cl. 178—5.2)

The invention relates to a transmission system for use in line-sequential color television, in which the number of lines per image is odd and two fields are combined into one image by interlaced scanning, and in which the brightness signal directly modulates the main carrier and two chrominance signals modulate a subcarrier sequentially, that is to say during one line one chrominance signal and during the next line the other chrominance signal. Such a transmission system is known under the name of "SECAM" system.

As is known, in all color television systems the luminance information Y, which is equal to that used in a black-and-white system, modulates the amplitude of the main video carrier of the high-frequency transmitter, while the two chrominance signals $C_1$ and $C_2$ are transmitted by modulation of one or more subcarriers which in the frequency spectrum of the transmitter lie between the video carrier and the sound carrier.

The color camera delivers three signals R, B and V, which correspond to the three primary colors red, blue and green respectively. By linear combination of these signals by means of a suitable matrix, the three signals Y, $C_1$ and $C_2$ are obtained, where $$Y=aV+bR+cB$$
$$C_1=(R-Y)$$
$$C_2=(B-Y)$$

the parameters $a$, $b$ and $c$ being determined by the known laws of colorimetry.

Conversely, at the receiver end, the above-mentioned system of three simultaneous equations containing three unknowns, is solved with the aid of a suitable matrix to separate the three signals R, B and V required for the operation of the electro-optical display system displaying the color picture.

For correct operation of this second or receiving matrix, the three signals Y, $C_1$ and $C_2$, which all vary with time, are simultaneously supplied to the second matrix. As has been mentioned, the signal Y always modulates the amplitude of the main video carrier. For the transmission of the signals $C_1$ and $C_2$, various solutions have been proposed:

Two subcarriers may be modulated separately and simultaneously, one by $C_1$ and the other by $C_2$ (in amplitude, frequency or phase).

Alternatively, a single subcarrier may simultaneously be modulated by $C_1$ and $C_2$ either in amplitude and in frequency or in amplitude and in phase (the American N.T.S.C.-system).

As is known, in the known SECAM-system, the two information signals $(R-Y)$ and $(B-Y)$, that is to say $C_1$ and $C_2$, are transmitted not simultaneously but successively by frequency modulation of a single subcarrier by $(R-Y)$ for the duration of the formation of a line for the horizontal scanning and subsequently by the signal $(B-Y)$ for the duration of the formation of the next line, and so on. Under these circumstances, the said matrix cannot fulfill its function, since the three necessary signals are not always simultaneously available, but only two are simultaneously available at any instnt: the signal Y always and alternately either of the signals $(R-Y)$ and $(B-Y)$.

An apparent simultaneity of the two latter signals is obtained by storing the chrominance signal of the preceding line in a memory by means of a delay line the delay time of which is equal to the duration of one line period. Thus, in addition to the always present luminance signal Y, the chrominance signal of the line being formed and, through the delay line, the chrominance signal of the preceding line are applied to the matrix.

Since the inputs of the matrix are each intended for a separate signal, the first for Y, the second for $(R-Y)$ and the third for $(B-Y)$, in known manner, either of the latter two inputs must alternately be connected to the input and to the output of the delay line in a manner such that during the formation of a line in which the signal $(R-Y)$ is transmitted, the input for $(R-Y)$ of the matrix is directly connected while the input for $(B-Y)$ is connected to the output of the delay line, whereas during the formation of the next line, which transmits the signal $(B-Y)$, the connections are reversed. This change-over is effected in known manner by a double electronic change-over switch of the bistable type which at the beginning of each line is flipped over by the signals which are taken from a suitable point of the synchronizing circuit or from the horizontal deflection circuit in the receiver.

In such a system, however, the probability of realizing the correct change-over is only 50%, and each loss of synchronism, however brief, involves the risk of an unintentional change of condition owing to an odd number of change-over errors. Consequently, a supplementary synchronizing signal for the color informations $(R-Y)$ and $(B-Y)$ must be available to set the bistable change-over switch periodically to the right condition; this will hereinafter be referred to as "setting."

As is well known, this setting can be effected with the aid of an auxiliary signal which is transmitted at the beginning of every line, or of every second line, during the black level which succeeds the horizontal synchronizing pulse or at the beginning of every field (or of every second field) during the lines which correspond to the black level during the fly-back of the vertical deflection. In the first case, the presence of the auxiliary signal during the back porch of the line synchronizing pulse suffers, although in a lesser degree, from the same drawbacks as the burst in the N.T.S.C.-system. In the second case, it is difficult to accommodate the identification signal, since the relevant lines are already partly occupied by test signals, which are also used in black-and-white transmissions and the presence of which greatly facilitates the checking of the transmitters used for the transmission and the beams transmitted by them.

In any case, the selection, the interpretation and the manipulation of the color identification signals require the presence in the receiver of an electronic circuit which has to satisfy exacting requirements, and this is a serious drawback of the SECAM system.

It is an object of the present invention to enable the chrominance information to be identified with the aid of the line and field synchronizing signals without the addition of any auxiliary synchronizing signal, so that the circuit arrangements of the transmitter and of the receiver are simplified, while avoiding the errors due to the presence of auxiliary identification signals.

Since the SECAM system in its hitherto known form is sequential at the line frequency and the number of lines per complete image (two interlaced fields) is odd (625), similarly to the black-and-white system, a complete cycle comprises four fields (two complete images) if there never is exception in the alternation of the lines which transmit $(R-Y)$ and the lines which transmit (*B—Y*), that is to say, if the whole process is completely sequential. As FIG. 1, which relates to the known system and will be described more fully hereinafter, shows, when the first line of a picture transmits (*R—Y*), the first line of the next picture transmits (*B—Y*), and so on. In contrast therewith, the cycle of the sychronizing signals comprises two fields (one complete image), as is shown by the same figure. Under these circumstances, it is impossible to carry the invention into effect.

If, however, according to the invention, the SECAM system is slightly altered by using instead of a completely sequential process a quasi-sequential process, that is to say, a process in which the first line and all the odd lines of each picture always transmit the same information about the color, for example (*R—Y*), a complete cycle comprises one image (two fields). As FIG. 2, which will be discussed more fully hereinafter, shows, in this event at the beginning of each picture there is an exception in the sequence of the (*R—Y*) lines and the (*B—Y*) lines, the two successive lines which bear the number 625 of one picture and the number 1 of the next picture and which both are odd lines, transmitting the same chrominance information, in the present example (*R—Y*).

As compared with the known SECAM system, the system according to the invention provides a simplification of the electronic circuit arrangements both at the transmitter end and at the receiver end and a material simplification of the signal, because no longer any identification signals are required to determine those image lines during the formation of which the signals are transmitted which correspond to one or the other of the two chromatic signals to be transmitted.

As is known, the structure of the sequence of the line and field synchronizing pulses of an interlaced-scanning system results in that the beginning (leading edge) of the field synchronizing signal coincides for one field with the beginning of the line number 1 and for the other field with the line number $1+625/2=313.5$, that is to say with the middle of the line number 313. However, 1 and 313 both are odd numbers.

Hence, by using the quasi-sequential method according to the invention, the setting of the electronic change-over switch for the signals relating to the color can be effected with the aid of the leading edge of the field synchronizing pulse, and this setting consequently is effected at the beginning of each field without any additional identification signal being required.

Experience shows that a viewer looking at a display device under normal conditions sees substantially no difference between the picture transmitted by the known completely sequential method and a picture transmitted by the quasi-sequential method according to the invention.

Since the identification pulse in accordance with the invention is derived from the succession of the synchronizing signals, it may be either the leading edge of the field synchronizing pulse (prior to mixing at the transmitter end and subsequent to separation at the receiver end, according to known systems, for example by amplitude limitation after partial integration or partial differentiation of the composite synchronizing signal) or a signal which is shifted in time with respect to the first-mentioned signal by accelerating or delaying this in known manner.

In order that the invention may readily be carried into effect, an embodiment thereof will now be described, by way of example, with reference to the accompanying diagrammatic drawings, in which FIG. 1 shows with respect to the succession of the sychronizing signals the succession of the color signals in the known SECAM system;

Figures 1A, 1B, 1C, 1D, 2A, 2B, 3A, 3B, 3C, 3D:
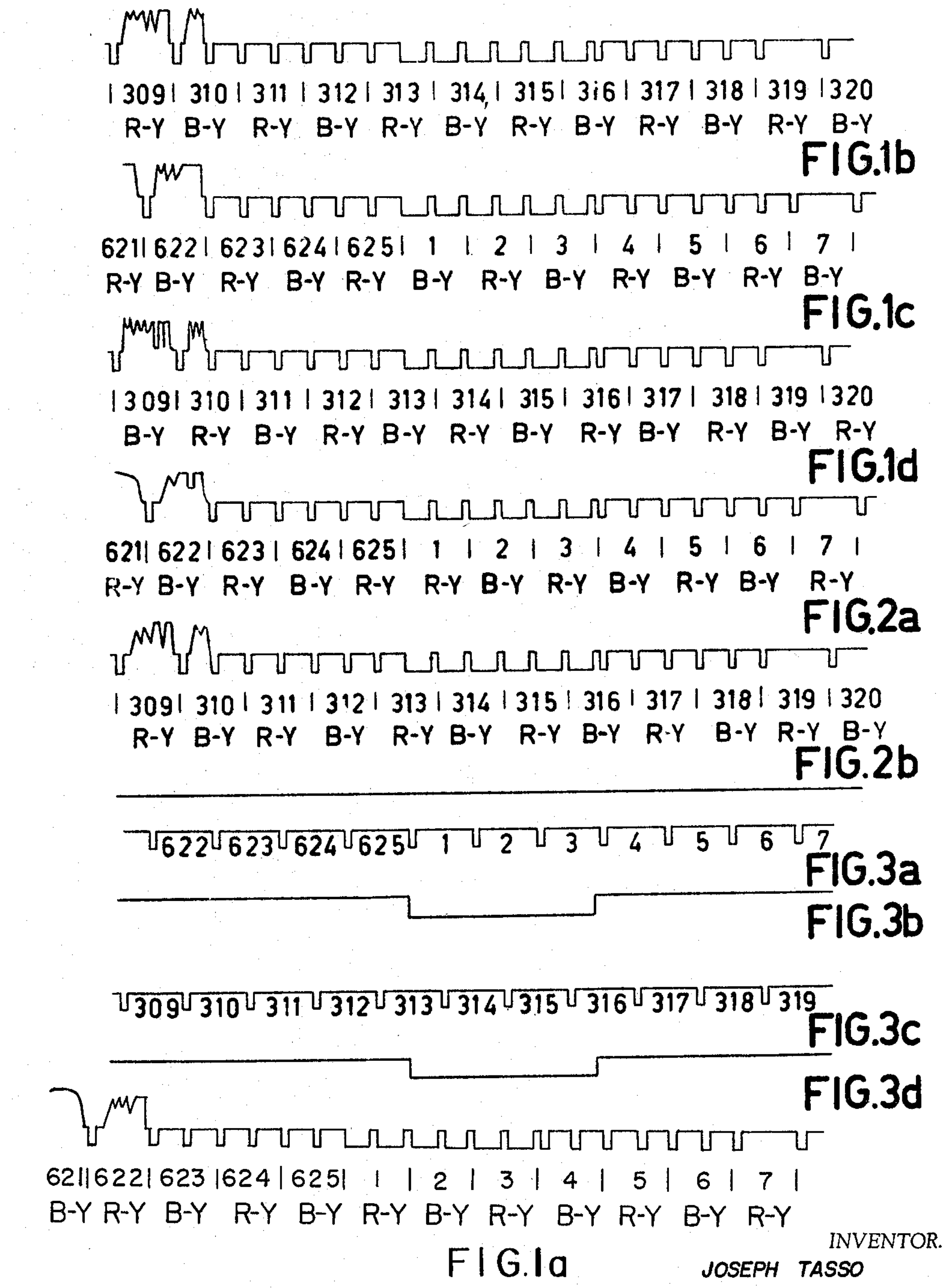
FIG. 2 shows the same elements in a quasi-sequential system in accordance with the invention.
FIG. 3 shows, with respect to the signals shown in FIG. 2, the position of the field and line synchronizing signals.

FIG. 1*a* shows the end of an image and the beginning of the next image in the known SECAM system; in this figure, the numbers of the horizontal deflection lines and the signal corresponding to the color transmitted during the formation of each line are indicated.

FIG. 1*b* shows under the same conditions as FIG. 1*a* the end of the first field and the beginning of the second field of the same image, the end of this second field being shown in the beginning of FIG. 1*c*.

FIG. 1*c* shows under the same conditions the end of the second field which has begun in Fig. 1*b* and the beginning of the first field of the next image.

FIG. 1*d* shows the end of the first field of the second image and the beginning of the second field of this image.

The various parts of FIG. 1 show that the beginning of the first field of the first image corresponds to a (*R—Y*) line (number 1) and the beginning of the second field of the same first image corresponds to a (*R—Y*) line (middle of number 313), while the beginning of the first field of the second image corresponds to a (*B—Y*) line (number 1) and the beginning of the second field of this second image corresponds to a (*B—Y*) line (middle of number 313).

FIG. 2*a* shows the end of an image and the beginning of the first field of the next image, while FIG 2*b* shows the end of this first field and the beginning of the second field in the system in accordance with the invention. These figures show that all the odd lines transmit the information *R—Y* and all the even lines transmit the information *B—Y*, and that this applies to all images.

FIGS. 3*a* and 3*b* show the unmixed line and field synchronizing pulses respectively which correspond to FIG. 2*a*, while FIGS. 3*c* and 3*d* show the same pulses which correspond to FIG. 2*b*. A consideration of FIGS. 2 and 3 shows that the leading edge of the field synchronizing pulse appears at the beginning of line number 1, that is to say an odd line (consequently *R—Y*), or in the middle of line number 313, that is to say an odd line (consequently *R—Y* as well).

Figure 4:
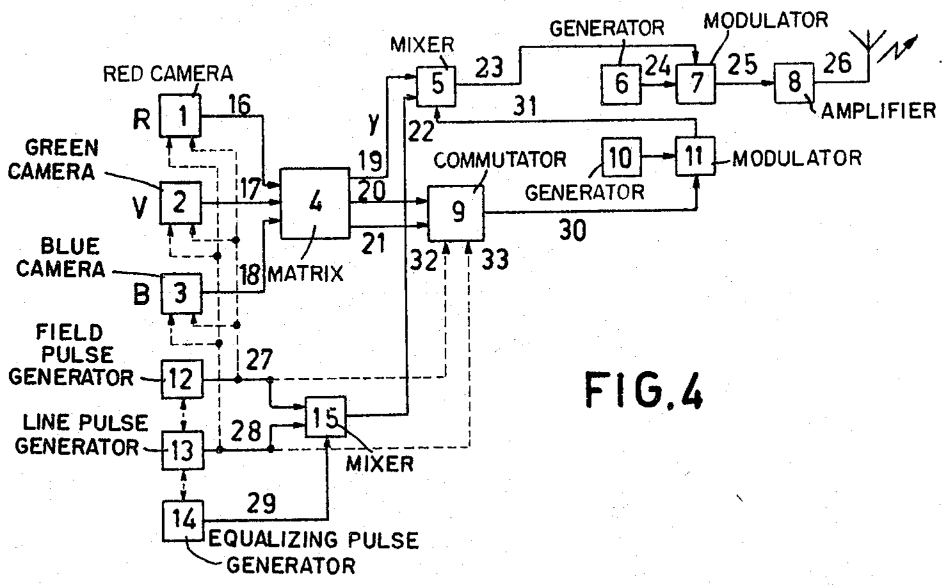
FIG. 4 is a schematic circuit diagram of a color television transmitter for use in a transmission system in accordance with the invention.

In FIG. 4, which is a schematic circuit diagram of a transmitter in accordance with the invention, reference numeral 1 denotes a camera which picks up the red component of the colored image, 2 the camera which picks up the green component and 3 the camera which picks up the blue component. These three components are applied through connections 16, 17 and 18 respectively to a matrix 4, at the outputs of which appear the luminance signal Y and the two chrominance signals (*R—Y*) and (*B—Y*). The signal Y is applied through a connection 19 to a mixer stage 5 in which it is combined with the composite synchronizing signals supplied through a connection 22. The product of the mixing operation forms the complete black-and-white video signal, which through a connection 23 is applied to the modulator 7, to which is also applied, by a generator 6, the high-frequency carrier which after modulation is amplified in 8 and is radiated by an aerial 26.

(*R—Y*) and (*B—Y*) are applied through connections 20 and 21 respectively to a simple bistable electronic commutator 9, which applies either of the two signals, that is to say alternately (*R—Y*) and (*B—Y*), through the connection 30 to a modulator 11, in which it modulates the subcarrier provided by a generator 10. This modulated subcarrier is applied through a connection 31 to the mixer stage 5.

A generator 12 delivers the field synchronizing pulses, a generator 13 the line synchronizing pulses and a generator 14 the known equalizing pulses. The pulses produced by these three generators are mixed in a mixer stage 15, which delivers the composite synchronizing signal through a connection 22. The field synchronizing pulses appearing in a connection 27 and the line synchronizing pulses appearing in a connection 28 are applied to the three cameras 1, 2 and 3 to ensure the synchronization thereof. The usual blanking signals are produced by generators which are not shown. The signals for suppressing the fly-back of the horizontal or vertical deflection may also be used instead of the synchronizing signals themselves to synchronize the cameras; this practice, which is commonly used in the operation of the transmitters, provides no difficulty in carrying out the method in accordance with the invention.

The field synchronizing pulses appearing at the connection 27 are applied to the input 32 of the electronic commutator 9. Through this input, the leading edge of the field synchronizing pulse gives rise to asymmetric synchronization of the bistable commutator so that the commutator is compelled to flip over to one of its stable conditions, and always to the same, whenever it receives a pulse. The line pulses appearing at the connection 28 are applied to the input 33 of the electronic commutator 9 and through this input effect symmetric synchronization of the bistable commutator so that the latter is compelled to flip over from one stable condition to the other whenever it receives a pulse. This may be simply effected with a bistable trigger circuit comprising two switching elements (thermionic tubes or transistors) by applying the line and field synchronizing pulses together through an addition circuit, for example a known circuit comprising two diodes, to the input of one of the two switching elements, while the line synchronizing pulses are applied to the input of the other switching element.

Figure 5:
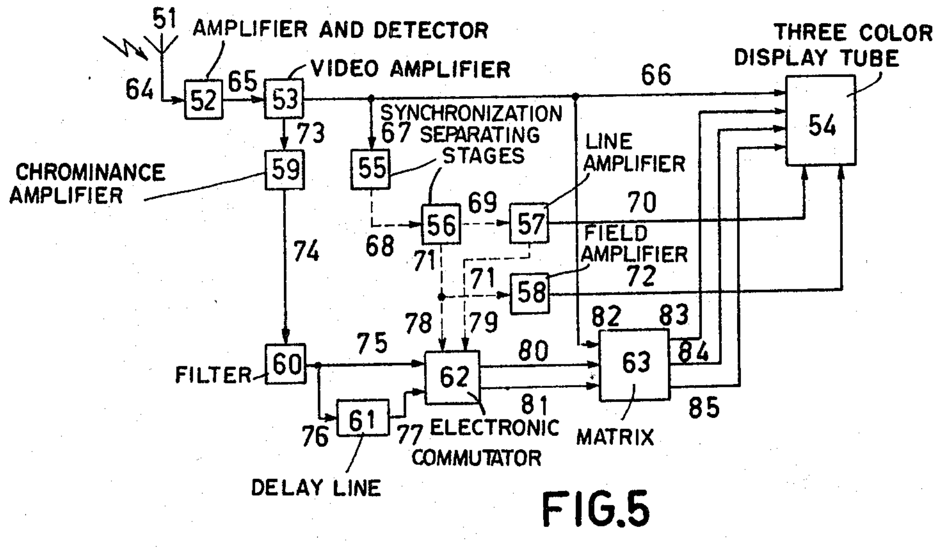
FIG. 5 is a schematic circuit diagram of a color television receiver for use in a transmission system in accordance with the invention.

In FIGS. 4 and 5, the control or synchronizing connections are shown by broken lines.

In the receiver in accordance with the invention shown in FIG. 5, the signals received by an aerial 51 are applied through a lead 64 to the high-frequency and intermediate-frequency amplifying stages and detection stages which together are shown by 52. The video-frequency output signal of 52 is applied through a connection 65 to a video amplifier 53. The video amplifier 53 provides the luminance signal Y which through a connection 66 is applied to the Y-input of the three-color display tube 54. The same signal is applied through a connection 67 to the first synchronization separating stage 55 which passes only the synchronizing signals from which the luminance information has been removed; these signals are applied through a connection 68 to a second separating stage 56, which through a connection 69 applies the line synchronizing signals and through a connection 71 the field synchronizing signals to the relaxation and power amplifying stages 57 for the lines and 58 for the fields, outputs 70 and 72 respectively of these stages being connected to the deflection members of the display tube 54.

The other output signal of the video amplifier 53, that is to say the sequential chrominance signal (alternately $R-Y$ and $B-Y$) is applied through a connection 73 to a selective amplifier 59. The output signal of the amplifier 59 is applied through a connection 74 to a filter 60 having a special frequency characteristic in order to amplify certain frequencies in a higher degree than other frequencies (de-emphasis filter). The output signal of the filter 60 is directly applied through a connection 75 to one of the inputs of an electronic commutator 62 controlled by a bistable stage and also through a connection 76, a delay line 61 and a connection 77 to the other input of 62; the synchronization of 62 is effected asymmetrically by the field signals applied through a connection 78 and also symmetrically by line signals (from which the equalizing pulses have been removed) which are taken from a suitable point of 57 and are applied through a connection 79. This method of synchronizing the bistable stage is equal to that used at the transmitting end and described hereinbefore with reference to FIG. 4.

The commutator 62, which is synchronized in a manner similar to that used for the synchronization of the bistable commutator at the transmitter end, through a connection 80 delivers the $(R-Y)$ signal and through a connection 81 the $(B-Y)$ signal. These signals are applied together with the Y-signal (through 82) to a matrix 63. The three output signals $(R-Y)$, $(B-Y)$ and $V-Y)$ of the matrix 63 are applied to the corresponding inputs of the display tube 54.

The FIGS. 4 and 5 show only those members the presence of which is absolutely necessary for an understanding of the invention. Other essential members which are known and are present in all universal color television systems, such as filters, delay lines for compensating the transit times, etc., are intentionally omitted to simplify the description. Evidently, such known members may be required for carrying the invention into effect.

Obviously, the embodiments described may be modified, particularly by replacing certain technical means by other, equivalent means, without departing from the scope of the invention.

What is claimed is:

1. A line-sequential color television system having an odd number of lines for each image and two interlaced fields for each image, said system comprising a transmitter and a receiver, said transmitter comprising sources of a luminance signal, a first chrominance signal, a second chrominance signal, a synchronization signal, a main carrier oscillation, and a subcarrier oscillation, means for modulating said luminance signal and synchronization signal on said main carrier, means for modulating said sub-carrier oscillations with said first chrominance signal only on each odd line of each of said fields, means for modulating said sub-carrier oscillations with said second chrominance signal on each even line of each of said fields, means for modulating said modulated sub-carrier oscillations on said modulated main oscillations to produce a complex signal, and means for transmitting said complex signal, said receiver comprising means for receiving and detecting said complex signal, means for separating said luminance signal, said synchronization signal and chrominance signals from said detected signals, first and second color channels, and means responsive to said synchronization signal for applying chrominance signals to said first channel only on each odd line of each field, and for applying chrominance signals to said second channel only on each even line of each field.

2. A line-sequential color television system having an odd number of lines for each image and two interlaced fields for each image, said system comprising a transmitter and a receiver, said transmitter comprising sources of a luminance signal, a first chrominance signal, a second chrominance signal, a line synchronization signal, a field synchronization signal, a main carrier oscillation, and a sub-carrier oscillation, first modulator means for modulating said luminance signal and synchronization signals on said main oscillation, second modulator means for modulating signals applied thereto on said sub-carrier oscillations, commutator means for applying said first and second chrominance signals to said second modulator means, means applying said line synchronization signals to said commutator means whereby said first and second chrominance signals are applied on alternate lines to said second modulator means, means applying said field synchronization signals to said commutator means whereby said first chrominance signal is applied to said second modulator means on the first and all other odd lines of each field, means for modulating said modulated sub-carrier oscillations on said modulated main oscillations to produce a complex wave, and means for transmitting said complex wave, said receiver comprising means for receiving and demodulating said complex wave, first and second color channels, and means responsive to said line and field synchronization pulses for applying chrominance signals to said first channel only during each odd line of each field and for applying chrominance signals to said second channel only during each even line of each field.

3. The television system of claim 2 in which said commutator means comprises a bistable commutator means having first and second stable states, whereby said field synchronization signal sets said bistable commutator means to said first state at the beginning of each field.

4. The television receiver of claim 2 wherein said means in said receiver responsive to said line and field synchronization means comprises bistable commutator means for applying said chrominance signals to said first and second channels, means applying said line synchronization signals to said bistable commutator means whereby said chrominance signals are applied to said first and second channels on alternate lines, and means applying said field synchronization signals to said bistable commutator means whereby said bistable commutator means is set to the same state at the beginning of each field.

5. The television system of claim 4 comprising delay line means having a delay equal to one line, and means for applying said chrominance signals directly and by way of said delay line simultaneously to said bistable commutator means.

References Cited by the Examiner

UNITED STATES PATENTS

| | | | |
|---|---|---|---|
| 2,538,041 | 1/1951 | Reeves | 178—5.4 |
| 2,870,248 | 1/1959 | Valeton et al. | 178—5.2 |

DAVID G. REDINBAUGH, *Primary Examiner.*

J. H. SCOTT, J. A. O'BRIEN, *Assistant Examiners.*